Feb. 5, 1957
V. P. VANIER
2,780,429
PIPE HANGER
Filed March 24, 1953
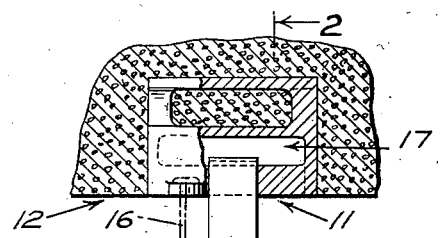
Fig. 1.
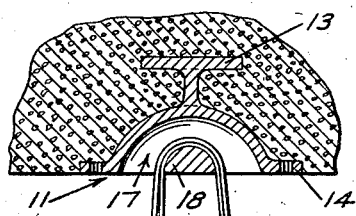
Fig. 2.
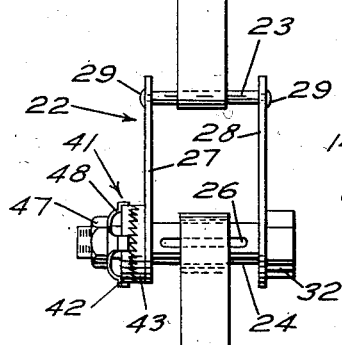
Fig. 3.
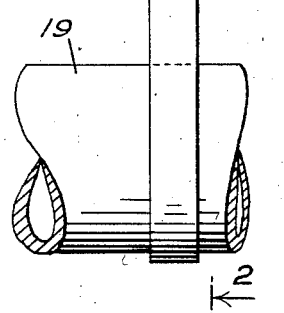
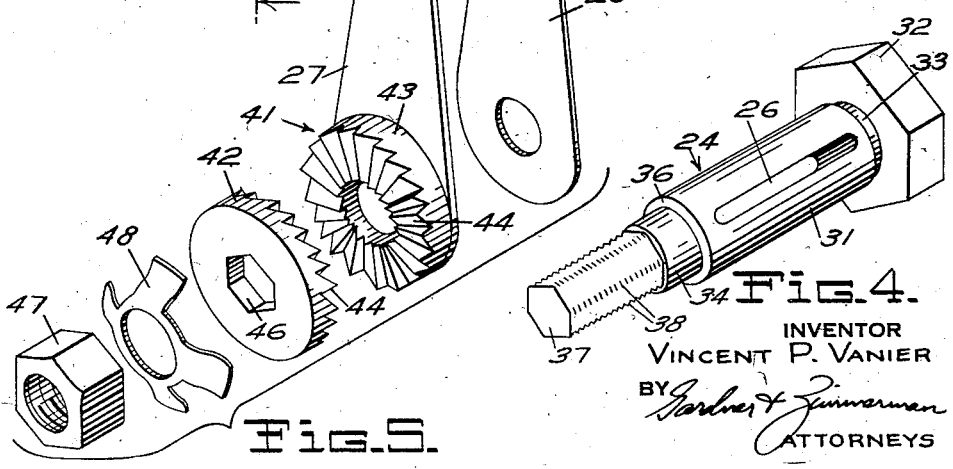
Fig. 4.
Fig. 5.
INVENTOR
VINCENT P. VANIER
BY
ATTORNEYS

# United States Patent Office 2,780,429
Patented Feb. 5, 1957

2,780,429

PIPE HANGER

Vincent P. Vanier, Oakland, Calif.

Application March 24, 1953, Serial No. 344,323

1 Claim. (Cl. 248—59)

The present invention relates to an improvement in pipe hangers and the like and more specifically to an improved adjustable pipe hanger.

Devices designed to support pipes or the like from overhead surfaces have long been known in the art and there have been developed numerous different pipe hangers of which some were rigid and others adjustable, however, those adjustable hangers developed have been found to be limited in use generally to the mere raising of a pipe into approximate position. Common adjustable pipe hangers are not adapted for precise control so as to readily and accurately position the pipe.

The present invention overcomes the limitations of prior known pipe hangers and has in addition to the capabilities of conventional pipe hangers added attributes which combine to produce a very practical and advantageous device. Thus the pipe hanger of the present invention has an adjustable length so that the pipe hung thereby may be vertically positioned as desired and includes means for precisely controlling this adjustment whereby great accuracy in pipe positioning is readily obtained. The pipe hanger of the invention includes an improved anchor block which may be rapidly and easily threaded by the pipe supporting strap and which is designed to strongly resist dislodgment from the member in which it is imbedded. Further, the adjusting means of the pipe hanger is positive acting to prevent slipping of the pipe either during adjustment of the pipe disposition or during the time the pipe is steadily supported by the pipe hanger and the adjusting means is suspended for easy access while being adapted for wrench adjustment to minimize the effort of adjusting same.

Accordingly it is an object of the present invention to provide an improved pipe hanger.

It is another object of the present invention to provide a pipe hanger having a ratchet adjustment.

It is a further object of the present invention to provide a positive acting fully suspended adjusting means with precise control for a pipe hanger.

It is yet another object of the present invention to provide a pipe hanger having an improved anchor block and a precisely adjustable hanger length.

It is a still further object of the present invention to provide in a pipe hanger a strap having a length adjusted by a ratchet that is adapted for rotation by a wrench to facilitate positioning of pipe suspended by the hanger.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claim.

A preferred embodiment of the invention is illustrated in the attached drawing wherein:

Figure 1 is an end elevation of the pipe hanger mounted in an overhead member and suspending a pipe therefrom.

Figure 2 is a sectional view taken at 2—2 of Figure 1.

Figure 3 is a perspective view of the anchor block.

Figure 4 is a perspective view of the shaft forming a part of the ratchet control means.

Figure 5 is an exploded perspective of the members of the ratchet control means that are mounted upon the shaft of Figure 4.

Considering now the construction of a pipe hanger embodying the features of the invention and referring to the drawing there is provided an anchor block 11 which is adapted to be imbedded in an overhead member 12. When the overhead member or ceiling 12 is formed of concrete or the like, as shown, anchor block 11 is set therein preferably before the concrete has set and anchor block 11 is provided with an upper T-shaped portion 13 extending lengthwise along the top thereof to provide a firm anchor within the concrete. Anchor block 11 in addition includes a plurality of lugs 14 about the periphery thereof at the lower block surface that are apertured to receive nails 16 which extend downwardly through lugs 14 into a construction form (not shown) disposed immediately subjacent the ceiling 12. After the form has been removed, the tang portions of the nails, indicated by dotted lines in the drawing, may be broken off. Interiorly anchor block 11 has a wide semicircularly curved passage 17 therethrough which is defined by a semicircular depression in the under surface of the block and a bar 18 extending across the center thereof with a convex upper surface disposed substantially parallel to the depression surface. The center bar or section 18 of anchor block 11 is preferably formed integral with the other portions of the block and in practice the entire anchor block may be advantageously cast in a single piece including T-shaped portion 13, lugs 14 and the depression and bar 18 defining semicircular passage 17.

The anchor block 11 is adapted to suspend therefrom a pipe or cable 19 by means of a strap 21 which together with an adjusting means 22 forms a closed loop with the strap extending from the adjusting means 22 through anchor block passage 17, under pipe 19 and back to the adjusting means. Below anchor block 11 there is provided a pin 23 extending parallel to anchor block bar 18 and strap 21 is looped about pin 23 and extends in double strands through anchor block 11 and under pipe 19 to a shaft 24 which has a longitudinal slot 26 therein through which the strap ends are threaded. Shaft 24 is also disposed parallel to anchor block bar 18 and is suspended below pin 23 by means of a pair of vertically disposed end pieces 27 and 28 that are each apertured at the bottom to accommodate shaft 24 and at the top to accommodate screws or the like 29 with threadably engaged opposite ends of pin 23. The top apertures of end pieces 27 and 28 are smaller than the diameter of pin 23 so that with pin screws 29 tightened against the end pieces they are maintained apart the length of pin 23.

The shaft 24, as shown in Figure 4, includes a round cylindrical center section 31 with a large hexagonal head 32 at one end thereof, there being formed a peripheral channel 33 about center section 31 adjacent head 32 of about the same width as the thickness of end piece 28. At the opposite end of center section 31 there is provided a short round cylindrical section 34 of lesser diameter than the center section 31 so that a shoulder 36 is formed about shaft 24 at this point, and a hexagonal section 37 extends longitudinally from shaft section 34. The hexagonal section 37 has machine threads 38 formed on the longitudinal edges thereof and extending the length of the hexagonal section. Regarding the connection of shaft 24, the aperture in the lower end of end piece 28 is made slightly greater than the diameter of shaft center section 31 so that the shaft may be inserted through the aperture until end piece 28 abuts shaft head 32 and rests in channel 33. The aperture in the lower end of the other end piece 27 may be the same size as the like aperture in end piece 28 or may be made only slightly larger than the diameter of the short shaft section 34 for end piece 27 fits upon short section 34 against shaft shoulder 36. As the hanger is adapted for use in a vertical position the weight of shaft 24 and of any pipe or the like carried by the hanger will hold shaft 24 in the bottom of the end piece apertures so that end pieces 27 and 28 will abut opposite ends of shaft center section 31 which is made the same length as pin 23 in order that the end pieces will be disposed vertically parallel. As previously noted, the strap ends are adapted to be inserted through the slot 26 in shaft 24 and the shaft 24 is then rotated and held in position so that the strap 21 in passing about shaft 24 extends over the strap ends to prevent the strap from becoming disengaged from shaft 24.

With regard to the turning of shaft 24 and maintaining same in position there is provided as a part of adjusting means 22, which includes pin 23 and shaft 24 depending therefrom by end pieces 27 and 28, a ratchet 41 which cooperates with the smaller end of shaft 24 and end piece 27. Ratchet 41 includes a rotatable ratchet wheel 42 and a fixed ratchet wheel 43, the latter of which is rigidly mounted upon the outer side of end piece 27 at the bottom thereof. Both ratchet wheels have a substantial thickness and have formed upon adjacent surfaces thereof radial grooves defining ratchet teeth 44. These teeth are each identical but are not individually symmetrical for each tooth has one side inclined at a much greater angle than the other side and the toothed surfaces of ratchet wheels 42 and 43 are mirror images of each other so that they are adapted to mesh together. Both ratchest wheels 42 and 43 have a substantial diameter so that they provide a large toothed surface for engagement and rigid wheel 43 has a central aperture mating with the aperture in the lower end of end piece 27 whereby both end piece 27 and attached ratchet wheel 43 slidably engage the short shaft section 34. Rotatable ratchet wheel 42 has a central hexagonal aperture 46 therein which is proportioned to slidably accommodate the hexagonal shaft section 37 so that ratchet wheel 42 may be slid onto shaft section 37 but is prevented from rotating thereon by the flat sides thereof.

In order to maintain the toothed surfaces of ratchet wheels 42 and 43 in intimate contact there is provided a hexagonal lock nut 47 having a threaded aperture therein adapted to engage the threads 38 upon the hexagonal shaft section 37, and a tension spring 48 adapted for disposition between nut 47 and rotatable ratchet wheel 42 to provide a spring connection therebetween. Tension spring 48 has a relatively large central aperture therein to fit over hexagonal shaft section 37 without contacting same and has a plurality of spring fingers extending therefrom longitudinally of shaft 24 when tension spring is disposed thereon so that tightening of lock nut 47 upon shaft threads 38 forces these fingers against ratchet wheel 42 and springs same to apply a force against ratchet wheel 42 from nut 47 while allowing ratchet wheel 42 to move longitudinally of shaft 24 by the impression thereon of a sufficient force to further compress tension spring 48.

With regard to the assembly and operation of the pipe hanger, the anchor block 11 is first securely fastened to the ceiling or other overhead member 12 as by imbedding therein and by bolts or screws 16. The strap 21 is then doubled and the looped end fed through the passage 17 in anchor block 11 over the bar 18 thereof and pin 23 is disposed through the looped strap end. End pieces 27 and 28 are secured to the opposite ends of pin 23 by bolts 29 in depending relation thereto and shaft 24 is placed through the apertures in the bottoms of end pieces 27 and 28. Shaft 24 is positioned so that end piece 28 fits in channel 33 of shaft 24 adjacent the head 32 thereof and end piece 27 then is disposed in abutting relation to shaft shoulder 36 with round shaft section 34 through the aperture therein. Rotatable ratchet wheel 42 is next placed on shaft 24 with the hexagonal wheel aperture 46 mating with the hexagonal shaft section 37 and the ratchet teeth 44 on ratchet wheels 42 and 43 in engagement. Tension spring 48 is placed on the end of shaft 24 with the spring fingers contacting ratchet wheel 42 and lock nut 47 is threaded upon the threads 38 of hexagonal shaft section 37 so that tension spring 48 is compressed to hold ratchet teeth 44 in engagement. The strap 21 may then be passed under a pipe 19 to be supported by the pipe hanger and the two free strap ends threaded through shaft slot 26.

Following this initial assembly the pipe hanger is adapted to raise the pipe to desired position, however, note that no disassembly of the adjusting means 22 is required to attach strap 21 thereto and the above description serves only to clarify the assembly of the adjusting means. Turning of shaft 24 as by head 32 thereof rotates rotatable ratchet wheel 42 which is locked to shaft 24 by the engagement of the hexagonal shaft section 37 with the hexagonal aperture 46 in ratchet wheel 42. The first few turns of shaft 24 serve to wrap strap 21 thereabout so that the turns bind against the strap ends and prevent same from slipping back through the shaft slot 26 and further turning of shaft 24 as by a wrench engaging shaft head 32 causes strap 21 to further wind about center shaft section 31 and to raise the pipe 19 suspended by the strap. As shaft 24 is turned to turn ratchet wheel 42 the ratchet teeth climb up each other to force the ratchet wheels apart thereby further compressing tension spring 48 until the teeth pass their maximum height in engagement where tension spring 48 forces ratchet wheel 42 back along shaft 24 to maximum engagement of the ratchet teeth. Ratchet wheel 43 is held immobile by attachment to end piece 27 which is in turn connected at its upper end to pin 23 and ratchet wheel 42 moves lengthwise of shaft 24 and rotates therewith to maintain the ratchet teeth in contact. As noted above the ratchet teeth are formed with one side at a sharper angle than the other so that the ratchet wheels can only be relatively rotated in one direction and no rotational force can move them in the other, the angle of tooth engagement being such that the resolution of the rotational force produces an insufficient axial force to compress tension spring 48.

While the adjusting means 22 has been described as including the whole assembly between the looped and free ends of the strap 21 and the ratchet 41 has been separately identified it will be appreciated that the term ratchet adjusting means may be properly employed to denote the means 22 as all of the portions thereof are at least indirectly associated with the ratchet itself.

What is claimed is:

An improved pipe hanger comprising an anchor block having a curved passage therethrough and being adapted for connection by the top thereof to an overhead member, a pin, a shaft having a longitudinal slot therein and an enlarged head at one end thereof, a strap secured to said pin and through said anchor block passage with a large loop below same and attached to said shaft through the slot in said shaft for winding thereabout with rotation of said shaft for shortening the strap loop, a pair of end pieces depending from opposite ends of said pin and having aligned apertures in the ends thereof through which said shaft extends, said shaft having a smaller diameter adjacent the head thereof in which one of said end pieces is disposed, said shaft further including a round section of reduced diameter with a shoulder at the other end thereof against which said other end piece abuts and a hexagonal end section with threaded edges, first and second ratchet wheels having adjacent radially toothed surfaces with the teeth thereof sloped in one direction with the first of said wheels being attached to said end piece about the round shaft section of reduced diameter whereby said shaft is freely rotatable within said end pieces and said first ratchet wheel, said second ratchet wheel having a hexagonal aperture therein and being disposed with the toothed surface thereof engaging the like surface of said first ratchet wheel and the hexagonal shaft section through the aperture therein whereby said second ratchet wheel is slidable longitudinally of said shaft and is locked to said shaft for rotation therewith, a lock nut threaded upon the hexagonal shaft section, and a tension spring about said shaft intermediate said lock nut and said second ratchet wheel urging said toothed ratchet wheel surfaces into engagement whereby rotation of said shaft within said end pieces in the direction said ratchet teeth are sloped to wind said strap about said shaft slides said second ratchet wheel against said tension spring to rotate the toothed engagement of said ratchet wheels and opposite rotation of said shaft is prevented by said ratchet wheel engagement.

References Cited in the file of this patent

UNITED STATES PATENTS

| | | |
|---|---|---|
| 260,551 | Elsey | July 4, 1882 |
| 299,506 | Banker | June 3, 1884 |
| 1,004,725 | Barclay | Oct. 3, 1911 |
| 1,083,728 | Clement | Jan. 6, 1914 |
| 1,923,657 | Beers | Aug. 22, 1933 |
| 2,350,767 | Keating | June 6, 1944 |